United States Patent
Povolny

(10) Patent No.: US 10,354,457 B2
(45) Date of Patent: Jul. 16, 2019

(54) METHOD FOR CAMERA-BASED TOLLING

(71) Applicant: Kapsch TrafficCom AG, Vienna (AT)

(72) Inventor: Robert Povolny, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 117 days.

(21) Appl. No.: 15/706,190

(22) Filed: Sep. 15, 2017

(65) Prior Publication Data

US 2018/0082491 A1    Mar. 22, 2018

(30) Foreign Application Priority Data

Sep. 21, 2016  (EP) ..................................... 16189918

(51) Int. Cl.
| | |
|---|---|
| *G07B 15/06* | (2011.01) |
| *G06F 16/51* | (2019.01) |
| *G06F 16/583* | (2019.01) |
| *G06F 16/58* | (2019.01) |
| *G06K 9/18* | (2006.01) |
| *G06K 9/32* | (2006.01) |
| *G07B 15/02* | (2011.01) |

(52) U.S. Cl.
CPC .............. *G07B 15/06* (2013.01); *G06F 16/51* (2019.01); *G06F 16/5846* (2019.01); *G06F 16/5866* (2019.01); *G06K 9/18* (2013.01); *G06K 9/325* (2013.01); *G07B 15/02* (2013.01); *G07B 15/063* (2013.01); *G06Q 2240/00* (2013.01)

(58) Field of Classification Search
CPC ........... G06K 9/00771; G06K 9/00778; G06K 9/00785; G06K 9/325; G06K 2209/05; G06T 2207/30236; G06Q 2240/00; G07B 15/02; G07B 15/06; G07B 15/063; G08G 1/0175
See application file for complete search history.

(56) References Cited

U.S. PATENT DOCUMENTS

2007/0008179 A1*  1/2007  Hedley et al. ......... G07B 15/06
                                                                340/928
2014/0270386 A1    9/2014  Leihs et al.

FOREIGN PATENT DOCUMENTS

EP          1975884 A1    10/2008
WO    2008/076463 A1     6/2008

OTHER PUBLICATIONS

Extended European Search report received for European Patent Application No. 16189918.2-1953, dated Mar. 29, 2017, 8 pages.

* cited by examiner

*Primary Examiner* — Andrew W Johns
(74) *Attorney, Agent, or Firm* — Fiala & Weaver P.L.L.C.

(57) ABSTRACT

Methods for tolling locations of a vehicle having a license plate number are performed by means of a tolling system. The tolling system has a camera at each location to be tolled, a server, a user terminal, linked by a network, and a database The method includes: generating one or more tolling records, each including a picture of the vehicle taken by one of the cameras, the location of the camera, and a license plate number read by optical character recognition from the picture, and storing the tolling records in the database; sending a confirmation request to the user terminal including the read license plate number and location information dependent on the locations in the tolling records; and receiving a response from the user terminal and, if the response confirms the request, deleting the pictures from the tolling records in the database. Alternative embodiments include pre-/post-registration of locations to toll.

30 Claims, 2 Drawing Sheets

METHOD FOR CAMERA-BASED TOLLING

CROSS-REFERENCE TO RELATED APPLICATION(S)

Figure 1:
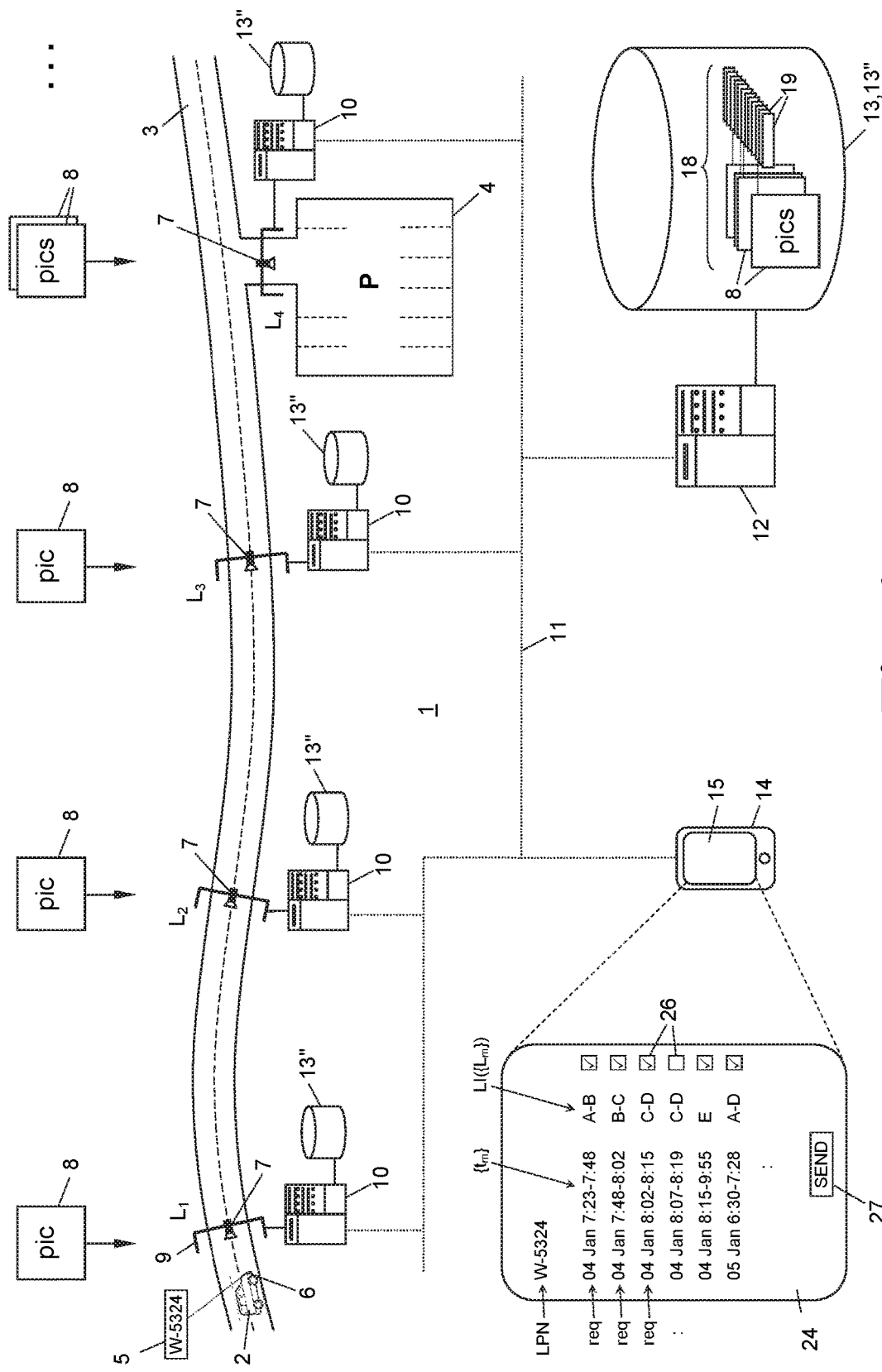

This application claims priority to European Patent Application No. 16 189 918.2, filed on Sep. 21, 2016, the entirety of which is incorporated by reference herein.

BACKGROUND

Technical Field

The present subject matter relates to a method for tolling one or more locations of a vehicle having a license plate number by means of a tolling system having a camera at each location to be tolled, a server, a database, a user terminal, and a network linking the camera(s), server and user terminal.

Background Art

In camera-based tolling systems, a picture of a passing vehicle is taken by a still camera or from the video stream of a video camera and processed by optical character recognition (OCR) to read the license plate number (LPN) of the vehicle at the location to be tolled. Tollable locations may, e.g., be toll roads, parking lots, borders, gates, etc., the passing or usage of which shall be charged. Cameras can be mounted on gantries, roadside facilities, buildings and the like in order to identify vehicles by OCR reading their LPNs and subsequently generate tolling records containing the LPNs and the locations of the respective cameras. The tolling records can then be used to charge user accounts set up for these LPNs.

OCR reading the LPN of a vehicle in a picture of the vehicle is, however, an error-prone process due to highly variable lighting and weather conditions, fields of view, dust, mud, snow or ice on vehicle license plates, degraded or tampered license plates etc. Therefore, special measures have to be taken to avoid charging users wrongly on the basis of faulty OCR readings. One of these special measures is to store for each tolling record, which includes an LPN reading result, also the original picture from which the LPN was read to allow for a later inspection, verification, or re-reading of the LPN in case of a charging failure or objection. The original pictures are stored somewhere in the tolling system, either decentralized at the camera sites or centralized at the server site. However, storing the pictures of only one single traffic camera at an ordinary highway can generate picture data in the range of several terabytes per day. In a tolling system for an entire road network, huge amounts of picture data in the range of several petabytes can accumulate swiftly in just a couple of days. This requires massive storage systems with correspondingly high installation, maintenance, and powering costs. Last but not least, transferring such vast amounts of picture data between camera sites and the server takes up a lot of communication resources in the linking network.

BRIEF SUMMARY

An object of the disclosed subject matter is to overcome these drawbacks of the conventional art and to provide a camera-based tolling system which is easier and less costly to install, power, and maintain.

To achieve these objects, in a first aspect the disclosed subject matter provides a method for tolling of the above-identified kind, comprising:

generating one or more tolling records, each including a picture of the vehicle taken by one of the camera(s), the location of said camera, and a license plate number read by optical character recognition from said picture, and storing the tolling record(s) in the database;

sending a confirmation request to the user terminal including the read license plate number and a location information dependent on the location(s) in said tolling record(s); and receiving a response from the user terminal and, if the response confirms the request, deleting the picture(s) from the tolling record(s) in the database.

In a second aspect, the objects of the disclosed subject matter are achieved with an alternative embodiment of the method identified at the outset, comprising:

receiving a registration request from the user terminal including a license plate number and a location information dependent on one or more locations to be tolled;

generating one or more tolling records, each including a picture of the vehicle taken by one of the camera(s), the location of said camera, and a license plate number read by optical character recognition from said picture, and storing the tolling record(s) in the database; and testing whether the tolling record(s) match(es) the registration request as to license plate number and location(s) and, if so, deleting the picture(s) from the tolling record(s) in the database, wherein the step of receiving is performed before, during or after the step of generating.

Both the embodiment according to the first aspect and the embodiment according to the second aspect of the disclosed subject matter provide a novel technical infrastructure for a fast, nearly real-time "self-declaration" of a location usage by the user, either by post-confirming or pre-registering the usage. The pictures of a declared, i.e., post-confirmed or pre- or post-registered, location usage may be immediately deleted from the system, reducing the storage load on the system to a great extent, according to embodiments. Only pictures of LPNs from confirmed or unregistered tolling records may be kept in the database of the system. All other pictures originating from a regular, compliant, non-erroneous, untampered operation of the system may be deleted.

The amount of storage necessary for storing original pictures in the system can thus be reduced to a small fraction of that of conventional systems, saving substantial installation, powering, and maintenance costs. In addition, the amount of data transferred between decentralized camera storages and centralized server storage can be significantly reduced when the pictures are stored at the decentralized camera sites and deleted there upon a successful confirmation or registration match as they will then never be transferred to the server.

While the two embodiments of the disclosed subject matter differ slightly in sequence of steps in that in the first aspect embodiment a request for confirmation of tolling records may be sent to the user terminal after the tolling records have been generated and in the second aspect embodiment a registration request concerning future locations to be tolled may be sent in advance, during or afterwards from the user terminal, both embodiments share the common concept of deleting OCR reading pictures in case of an active acknowledgement by a user terminal.

In both aspects of the disclosed subject matter, each tolling record may optionally include a time when its picture was taken by the camera. Such "time stamps" are very useful to enhance tolling accuracy.

In a first variant of the disclosed subject matter that makes use of such time stamps, the methods can proceed from the generating step to the sending or testing step, respectively, when the times in two successively generated tolling records differ by more than a predetermined time span. In other words, tolling records may be generated and accumulated as long as they do not "pause" for a "timeout" period, which would indicate that travelling a route consisting of a sequence of route legs, which may each be charged by a tolling record, has been terminated, whereafter it makes sense to send these tolling records to the user terminal for post-confirmation, or to test them for a match with a pre- or post-registered route.

In a second variant of the disclosed subject matter, making use of such time stamps the methods can proceed from the generating step to the sending or testing step, respectively, when the time in a most recently generated tolling record differs from the time in a tolling record of a preceding sending or testing step by more than a predetermined time span. This variant sends a batch of tolling records at regular time intervals to the user terminal for post-confirmation or tests it for a match with a pre- or post-registered route, respectively.

In a third variant of the disclosed subject matter, the methods proceed from the generating step to the sending or testing step, respectively, when the location in a most recently generated tolling record differs from the location in a tolling record of a preceding sending or testing step by more than a predetermined distance. This triggers the confirmation request or match testing, respectively, every time when a certain distance is passed.

Optionally, when a confidence level of the optical character recognition reading of the license plate number is below a given threshold, the respective picture or tolling record may be deleted, which yields a further reduction of picture storage.

A confidence level-based deletion of this kind may lead to "gaps" in a sequence of tolling records along a route. To compensate for such gaps, in a further embodiment of the disclosed subject matter two or more tolling records can be merged into a "merged" tolling record when their locations match a predetermined geographical sequence, for example, tolling locations along a route such as a toll highway or during a parking stay at one and the same parking lot.

Merging several individual tolling records into one merged tolling record frees up storage and makes handling in the confirmation and testing steps easier. Therefore, in further embodiments of the inventive methods, the merged tolling records may be used in said sending and receiving steps or in said testing step, respectively. The user can thus, e.g., post-confirm or pre- or post-declare an entire route to be travelled, consisting of several tolling locations, on the basis of a single merged tolling record.

The database which stores the pictures in the system can be maintained centrally at the server. Alternatively, the database comprises first parts kept at the camera(s) and a second part kept at the server and the picture(s) is/are stored in the first parts, wherein a picture may be transferred from the first parts to the second part when the response does not confirm or the testing does not match, respectively. Storage capacity can thus be distributed over multiple camera sites. Communication traffic can be greatly reduced between the cameras and the server when only pointers to the pictures stored locally at the cameras may be exchanged over the network during manipulation of the tolling records.

According to a further optional feature of the disclosed subject matter, an electronic signature may be received with the response or registration request, respectively, and may be stored with a tolling record the picture of which is deleted. For tolling records (or merged tolling records) that have been confirmed upon request or that have matched a pre- or post-registration, the picture may be "substituted" by an electronic signature in the tolling record, indicating its confirmation or registration, respectively.

The user terminal can, e.g., be a personal computer linked to the network over the internet. In a further embodiment, the user terminal is, however, a mobile device such as a smart phone or tablet computer and the network includes a mobile network such as a 3G, 4G, 5G, etc. mobile phone network which serves the mobile device. With this setup, the user can register or confirm tolling records "on the go" immediately before or after a ride. Optionally, the confirmation request or registration request, respectively, may be sent by a short message, an email, a webpage, or a data connection to an application on the mobile device.

The location usages tollable by the methods of the disclosed subject matter can be of any kind, as detailed at the outset. In particular, a location can be a parking lot and the camera may then be directed towards an entrance, a parking space or an exit of the parking lot; or the location may be a road segment and the camera may be directed towards this road segment.

BRIEF DESCRIPTION OF THE DRAWINGS/FIGURES

Figure 2:
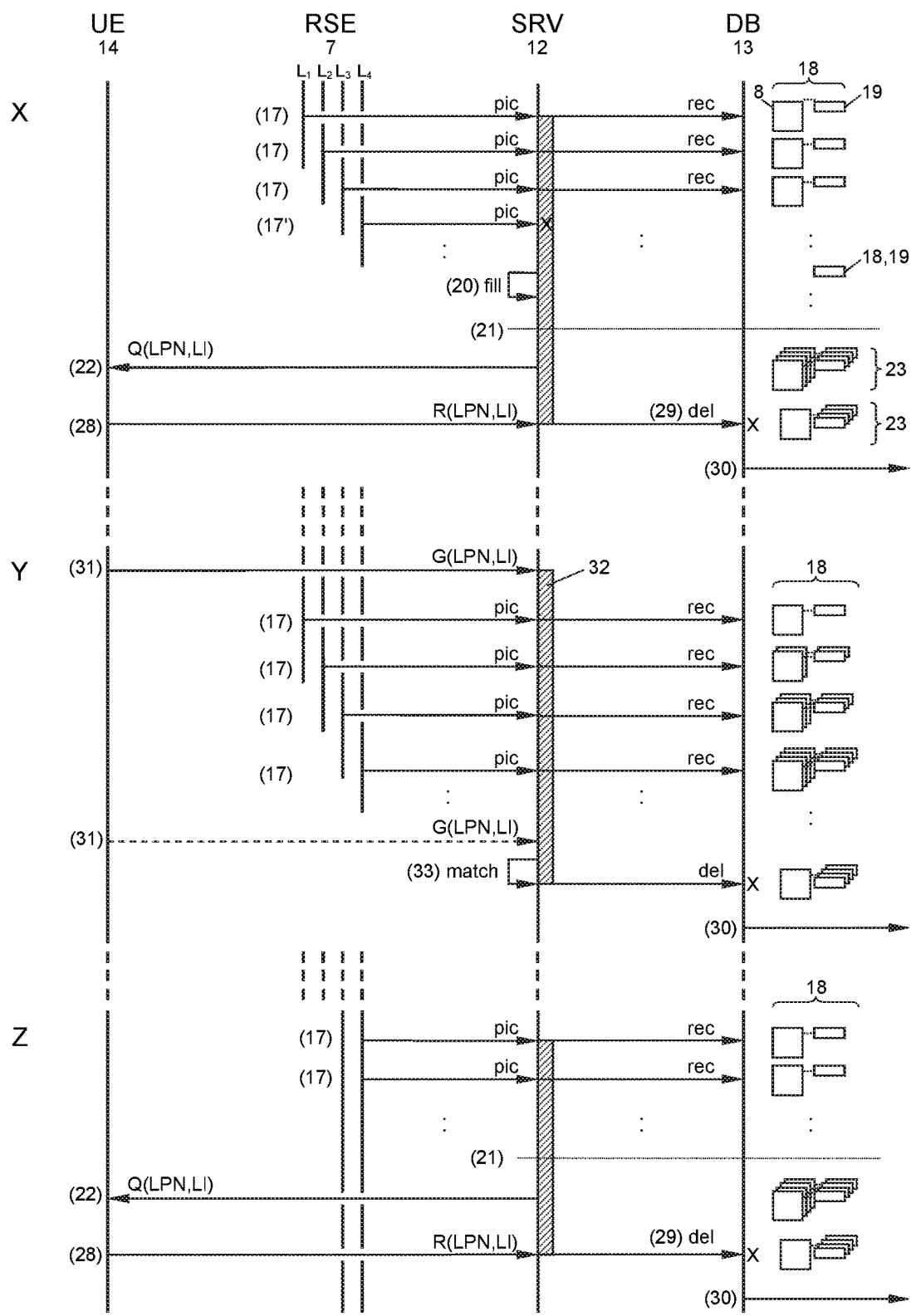

The disclosed subject matter will now be explained in detail by means of exemplary embodiments thereof with reference to the enclosed drawings, in which:

FIG. 1 shows a camera-based tolling system as used in the methods of the disclosed subject matter in a schematic block diagram; and FIG. 2 shows four exemplary embodiments of the methods of the disclosed subject matter in form of a sequence diagram.

DETAILED DESCRIPTION

With reference to FIG. 1, the methods of the disclosed subject matter may be employed in a tolling system 1 devised for tolling the use of locations $L_1, L_2, L_3, L_4, \ldots$, generally $L_m$, by vehicles 2. An exemplary vehicle 2 is shown travelling a toll road 3 or parking on a chargeable parking lot 4, respectively. The vehicles 2 may be identified in the tolling system 1 by their license plate number (LPN) 5, here: "W-5324", as it is printed on a license plate 6 of the vehicle 2.

To ascertain that a vehicle 2 uses a location $L_m$, each tollable location $L_m$ may be provided with a camera 7, according to embodiments. The camera 7 may be directed towards its location $L_m$ to take a picture ("pic") 8 of the vehicle 2 including its license plate 6 (at least of that part of the vehicle 2 which includes the license plate 6) so that the LPN 5 can be seen and read in the picture 8.

The cameras 7 can, e.g., be mounted on gantries 9 spanning the road 3, on poles or buildings aside the road 3 ("roadside"), at an entrance and/or exit of the parking lot 4, at a gate or border, etc. Each camera 7 may be provided with an on-site processor 10 and connected over a network 11 to a central server 12 of the tolling system 1, according to embodiments.

The toll (fee) charged for a usage of a location $L_m$ can be a flat fee or dependent on distance travelled to or from this location and/or time spent at this location. For example, the toll charged for the location $L_2$ can be dependent on the distance between the preceding chargeable location $L_1$ and the present location $L_2$, or on the length of a road section on which the location $L_2$ lies; or dependent on a time spent such as, e.g., on the location $L_4$ of the parking lot 4, i.e., the time $T=t_2-t_1$ spent between the time $t_1$ of a first picture 8 taken at entering the parking lot 4 via the location $L_4$ and the time $t_2$ of a second picture 8 taken at exiting the parking lot 4 via the same location $L_4$. It should be noted that a camera 7 cannot only monitor the entrance or exit of a parking lot 4 but could also monitor the entire area of the parking lot 4 and take pictures at regular intervals to identify the parking duration T of a vehicle 2 with the same LPN 5.

The pictures 8 taken by the cameras 7 may be stored in a database 13, according to embodiments. The database 13 can either be kept centrally at the server 12 or be distributed over the system 1 in a decentralized way. In the latter embodiment, first parts 13' of the database 13 may be kept at the cameras 7, e.g., connected to their processors 10, and each store the pictures 8 taken by the respective camera 7; while a second, centralized part 13" of the database 13 may be kept at the server 12 and collects tolling records ("rec") and pictures 8 over the network 11, as will be detailed further below.

For basic system functionality it does not matter where the pictures 8 physically reside, either at the first parts 13' or the second part 13" of a distributed database 13, or only at a central database 13. When the pictures 8 are stored locally at the parts 13' of the cameras 7 they can, e.g., be referenced or indexed by pointers from the central part 13". To minimize data traffic over the network 11, in one embodiment the pictures 8 may be stored locally at the cameras' database parts 13' and may be transferred to the server's parts 13" only when necessary, according to embodiments.

Connected to the network 11 may be at least one user terminal 14 with an input and output device. The user terminal 14 can be a data terminal, personal computer, notebook or tablet computer or a smart phone with a touch screen 15 as input and output device.

The network 11 which links cameras 7, server 12 and user terminals 14 can be of any kind, e.g., the Internet, or suitably segmented, for example a data network which links server 12 and cameras 7 and has a gateway to the Internet or to a mobile phone network serving user terminals 14 in the form of mobile devices such as smart phones.

FIG. 2 shows three exemplary embodiments of methods performed within the tolling system 1 of FIG. 1.

Section X of FIG. 2 refers to a first embodiment of "post-confirmation" of tollable locations; Section Y of FIG. 2 refers to a second and a third embodiment of registration ("pre- or post-declaration") of tollable locations; and section Z of FIG. 2 shows an application of the first embodiment to the tolling of the parking lot 4.

In the first embodiment of a "post-confirmation" shown in section X, one or more cameras 7 each take a picture (pic) 8 and send it with an identifier of their respective location $L_m$ to the server 12 (step 17). The server 12 OCR-reads the LPNs 5 of vehicles 2 in the pictures 8 and generates tolling records ("rec") 18 for the database 13. The OCR-reading of the LPNs 5 in the pictures 8 can alternatively be done by the processors 10 of the cameras 7.

The tolling records 18 each comprise a picture 8 and a data part 19 which includes an LPN 5 read in the picture 8, the location $L_m$ of the respective camera 7 which took the picture 8, an optional confidence value CV of the OCR process reading the LPN 5, and further metadata as necessary. Optionally, the tolling records 18 each also include the time $t_n$ when the picture 8 was taken by the respective camera 7.

The tolling records 18 can be stored either in the first parts 13' or the second part 13" of the database 13 or can be distributed over the first and second parts 13', 13" so that, e.g., the pictures 8 could be kept locally in the first parts 13' at the cameras 7 as detailed above. Furthermore, the tolling records 18 can be generated either by the server 12 as shown in FIG. 2 or generated locally by the processors 10 of the cameras 7, or generation could be split among the local processors 10 and the server 12.

If the confidence level CV of the OCR reading result LPN 5 in a tolling record 18 does not reach a predetermined minimum threshold, the picture 8 in that tolling record 18 (or the entire tolling record 18) could be deleted right away, either at the camera 7 or the server 12, as is shown schematically in generating step 17'.

The server 12—or a camera's processor 10—may be configured to analyze the sequence of locations $L_m$ showing up in subsequent tolling records 18 and compare or match these locations $L_m$ with a predetermined geographical sequence (such as the sequence $L_1$-$L_2$-$L_3$ on the road 3 in FIG. 1) to "fill" any "gaps" which might occur due to the deletion of a tolling record 18 in step 17' or a general failure of a camera 7 etc. Such "gap filling" can optionally generate additional tolling records 18 having only a data part 19, as is shown in step 20.

After each generating step 17 or when a certain set of tolling records 18 has been generated, the set being determined by criteria 21 explained below, a confirmation request "Q" may be sent from the server 12 (or a camera 7) to the user terminal 14 (step 22), according to embodiments. The criteria 21 which let the method proceed from the generating steps 17, 17', 20 to the sending step 22 can be one or more of the following:

i) The times $t_n$ in two successively generated tolling records 18 differ by more than a predetermined time span $T_{timeout}$, i.e. $t_{n+1}-t_n > T_{timeout}$. This is based on the assumption that the vehicle 2 may have terminated travelling the road 3 or pauses for a longer time period so that a user's trip may have finished.

ii) The time $t_n$ in the most recent tolling record 18 of the steps 17 differs from the time $t_{n-x}$ in the last tolling record 18 which was sent in an earlier sending step 22, i.e., in FIG. 2 in a sending step 22 (not shown) preceding the steps 17, by more than a predetermined time span $T_{send}$. This implements a periodical triggering of the sending of an accumulated set of tolling records 18 in step 22 in intervals of roughly said predetermined time span $T_{send}$.

iii) The location $L_m$ in the most recently generated tolling record 18 of the steps 17 differs from the location $L_{m-x}$ in the last tolling record 18 which was sent in an earlier sending step 22 (not shown in FIG. 2) by more than a predetermined distance $D_{send}$. This implements a periodical sending of confirmation requests 22 at geographical intervals of roughly $D_{send}$.

When the confirmation request Q of step 22 is triggered either after each generating step 17 or according to one or more of the criteria i)-iii) mentioned above, one tolling record 18 or a set 23 of tolling records 18 for a certain LPN 5 may be available in the database 13, according to embodiments. In the sending step 22, the confirmation request Q may be sent to that user terminal 14 that is identified by the LPN 5 indicated in the set 23. For example, user terminals 14 can be directly addressed by LPNs 5, i.e., each vehicle 2 may be associated with one user terminal 14 and vice-versa. To this end, in a preceding registration step (not shown) a user can register a user terminal 14 that is addressable by, e.g., a mobile phone number in the network 11, for an LPN 5 with the network 11 or the server 12.

FIG. 1 shows an exemplary touch screen display 24 on the touch screen 15 of the user terminal 14 with a list of confirmation requests Q for the LPN 5. In the screen display 24, the confirmation requests Q displayed contain data from the data parts 19 of the tolling records 18 in a processed form, here for example route legs A-B, B-C, and C-D between locations $L_1$ and $L_2$, $L_2$ and $L_3$, $L_m$ and $L_{m+1}$, respectively, with the respective passing times $t_1$-$t_2$, $t_2$-$t_3$ and $t_m$-$t_{m+1}$ of the route leg start and end locations; an example of a parking location E=$L_4$ with start and end times of parking; as well as an example of a route ("trip") A-D over several route legs, with the respective passing times of the route start and end locations.

At minimum, a confirmation request Q of step 22 includes an LPN 5 the request relates to and a location information LI (such as $L_m$, A-B, B-C, E, A-D, . . . ) which depends on one or more locations $L_m$ of one or more tolling records 18. However, the location information LI contained in a confirmation request Q does not need to enumerate individual tollable locations $L_m$ but can also be a generalized or geographically map-matched generalization of locations $L_m$, such as the exemplary route A-D, which identifies a sequence of tolling locations $L_1$, $L_2$, $L_3$, . . . travelled along; all this being comprised by the term "dependency" of the location information LI on the location(s) $L_m$.

As an option, in step 22 two or more tolling records 18 of the set 23 could be merged into a "merged tolling record", for example tolling records 18 which relate to a route (leg) spanning several locations $L_m$, $L_{m+1}$, $L_{m+2}$ etc. The merging of individual tolling records 18 into merged tolling records 18 can, e.g., be performed when the times $t_n$, $t_{n+1}$, . . . of two or more tolling records 18 fall within a predetermined time span, i.e., are timely close to each other. Additionally or alternatively, two or more tolling records 18 can be merged into a merged tolling record 18 when their locations $L_m$ match a predetermined geographical sequence, e.g., a route defined by a sequence of tolling locations $L_m$. Such merged tolling records 18 could be substituted for the original (individual) tolling records 18 in the course of the further procedure.

Having received the confirmation request Q in step 22, the user then confirms (or rejects, i.e., does not confirm) the confirmation request Q by means of the user terminal 14. In the example shown in FIG. 1, the user ticks a confirmation box 26 relating to a confirmation request Q and presses a "send" button 27. This initiates step 23 of sending a response "R" from the user terminal 14 to the entity having sent the request Q, i.e., to the server 12 or the requesting camera 7. The response R contains a reference to the request Q it relates to, and an indication whether this request is confirmed or not. In the simplest case the mere existence of a response R may be an indication of confirmation.

When the response R is received in step 28, the server 12 (or camera 7) deletes all those pictures 8 from the tolling records 18 in the database 13 to which the request Q was related, see deletion step 29. As a result, only tolling records 18 for which no confirmative response R is received in step 28 still contain pictures 8, whereas all other tolling records 18 may be reduced to their data part 19, in embodiments. The deletion of the pictures 8 in step 29 frees up memory in the database 13 and preserves only those pictures 8 which might be necessary to revisit for checking or repeating the OCR reading or in case of other system failures, according to embodiments.

In step 30 the tolling records 18 may be retrieved from the database 13 for further processing such as checking, re-validation, re-OCR-reading, charging, accounting and enforcement of tolls, in embodiments.

In section Y of FIG. 2, second and third embodiments of the method are shown. In the second embodiment of a "pre-declaration", in a first step 31 a registration request "G" may be sent from the user terminal 14 to the server 12, according to embodiments. The registration request G of step 31 includes at least a reference to an LPN 5 of a vehicle 2 and a location information LI—such as route A-D, route legs A-B, B-C, parking lot E etc.—which may be dependent on one or more locations $L_m$ tollable by the cameras 7. As in the first embodiment, also in the second embodiment the location information LI contained in a registration request G does not need to enumerate individual tollable locations $L_m$ but can be a merged, generalized or geographically map-matched generalization of locations $L_m$, i.e., may be "dependent on" the location(s) $L_m$, such as the exemplary trip or route A-D, which designates a sequence of tolling locations $L_m$, according to embodiments.

Having received the registration request G in step 31, the server 12 starts a process 32 in which the cameras 7 take pictures 8 (steps 17), and tolling records 18 may be generated in the same way as in the first embodiment explained above. The tolling records 18 accumulate in the database 13.

After each generation step 17 or when one of the criteria i), ii), or iii) explained above is met during accumulation of the tolling records 18, a testing step 33 may be started, in embodiments. In the testing step 33 the process 32 tests whether the tolling records 18 accumulated so far match the registration request G as to LPN 5 and locations information indicated in the registration request G. In the simplest form the matching step 33 checks whether a tollable location $L_m$ indicated in the registration request G has been passed, i.e., whether there is a tolling record 18 containing this location $L_m$. In more complex forms, the matching step 33 can comprise a geographical map-matching, wherein the sequence of locations $L_m$ of a sequence of tolling records 18 may be geographically compared ("map-matched") to the location information LI such as routes A-D, legs A-B, B-C, lot E etc. indicated in the registration request G, according to embodiments. If the testing step 33 yields a "match", then the server 12 deletes all those pictures 8 from the tolling records 18 to which the registration request G relate. As a result, again, the number of pictures 8 in the database 13 may be greatly reduced. In the final step 30 the tolling records 18 with their remaining pictures 8 may be retrieved from the database 13 for further processing, as in the first embodiment.

In the third embodiment of a "post-declaration" depicted in section Y of FIG. 2, the step 31 of sending the registration request G is done at any time during or after the generating step(s) 17, as is exemplarily shown in broken lines.

The bottom section Z of FIG. 2 shows a fourth embodiment based on the first embodiment (confirmation request/response), see steps 22 and 28. Here, however, the generating steps 17 originate from one and the same camera 7, e.g., at the entrance and exit of the parking lot 4. Successive tolling records 18 do not differ in locations $L_m$, but only in times $t_n$ which may be useful for tolling a location usage dependent on time spent at the location $L_m$, according to embodiments. Here also, the number of pictures 8 can be massively reduced, after receiving a confirmatory response R in step 28, by means of the deletion step 29. Of course, for tolling a parking lot also the second embodiment of section Y of FIG. 2 could be employed.

In all embodiments, when a picture 8 may be deleted in the database 13, an electronic signature of the user terminal 14 that has sent the respective confirmation response R in step 28 or registration request G in step 31 can be stored in the tolling record 18.

When the pictures 8 are stored locally in the database parts 13' at the cameras 7, they can be either deleted there in the steps 29, or they can be transferred to the central part 13" of the database 13 when there is no confirmation step 28 or no match in step 33. In addition, the pictures 8 can also be transferred from the first parts 13' to the second part 13" at regular intervals, when the first parts 13' exceeds a size threshold, or upon request, e.g., when required in step 30, according to embodiments.

CONCLUSION

The disclosed subject matter is not restricted to the specific embodiments disclosed herein but encompasses all variants, equivalents, modifications and combinations thereof which fall into the scope of the appended claims.

What is claimed is:

1. A method for tolling one or more locations of a vehicle having a license plate number by means of a tolling system having a camera at each location to be tolled, a server, a database, a user terminal, and a network linking the camera(s), server and user terminal, the method comprising:
   generating one or more tolling records, each including a picture of the vehicle taken by one of the camera(s), the location of said camera, and a license plate number read by optical character recognition from said picture, and storing the tolling record(s) in the database;
   sending a confirmation request to the user terminal including the read license plate number and a location information dependent on the location(s) in said tolling record(s); and
   receiving a response from the user terminal and, if the response confirms the request, deleting the picture(s) from the tolling record(s) in the database.

2. The method of claim 1, wherein each tolling record includes a time when said picture was taken by the camera.

3. The method of claim 2, further comprising:
   proceeding from the generating step to the sending or testing step, respectively, when the times in two successively generated tolling records differ by more than a predetermined time span.

4. The method of claim 2, further comprising:
   proceeding from the generating step to the sending or testing step, respectively, when the time in a most recently generated tolling record differs from the time in a tolling record of a preceding sending or testing step by more than a predetermined time span.

5. The method of claim 1, further comprising:
   proceeding from the generating step to the sending or testing step, respectively, when the location in a most recently generated tolling record differs from the location in a tolling record of a preceding sending or testing step by more than a predetermined distance.

6. The method of claim 1, wherein, when a confidence level of the optical character recognition reading of the license plate number is below a given threshold, the respective picture or tolling record is deleted.

7. The method of claim 1, wherein two or more tolling records are merged into a merged tolling record when their locations match a predetermined geographical sequence.

8. The method of claim 7, wherein said merged tolling record(s) is/are used instead of said tolling record(s).

9. The method of claim 1, in which each tolling record includes a time when its picture was taken by the camera, wherein two or more tolling records are merged into a merged tolling record when their times fall within a predetermined time span.

10. The method of claim 9, wherein said merged tolling record(s) is/are used instead of said tolling record(s).

11. The method of claim 1, wherein the database comprises first parts kept at the camera(s) and a second part kept at the server and wherein the picture(s) is/are stored in the first parts, and wherein a picture is transferred from the first parts to the second part when the response does not confirm or the testing does not match, respectively.

12. The method of claim 1, wherein an electronic signature is received with the response or registration request, respectively, and is stored with a tolling record the picture of which is deleted.

13. The method of claim 1, wherein the user terminal is a mobile device and the network includes a mobile network serving the mobile device.

14. The method of claim 13, wherein the confirmation request or registration request respectively, is sent by a short message, an email, a webpage, or a data connection to an application on the mobile device.

15. The method of claim 1, wherein the location is a parking lot and the camera is directed towards an entrance, a parking space or an exit of the parking lot; or the location is a segment of a road and the camera is directed towards this road segment.

16. A method for tolling one or more locations of a vehicle having a license plate number by means of a tolling system having a camera at each location to be tolled, a server, a database, a user terminal, and a network linking the camera(s), server and user terminal, the method comprising:
   receiving a registration request from the user terminal including a license plate number and a location information dependent on one or more locations to be tolled;
   generating one or more tolling records, each including a picture of the vehicle taken by one of the camera(s), the location of said camera, and a license plate number read by optical character recognition from said picture, and storing the tolling record(s) in the database; and
   testing whether the tolling record(s) match(es) the registration request as to license plate number and location(s) and, if so, deleting the picture(s) from the tolling record(s) in the database,
   wherein the step of receiving is performed before, during or after the step of generating.

17. The method of claim 16, wherein each tolling record includes a time when said picture was taken by the camera.

18. The method of claim 17, further comprising:
   proceeding from the generating step to the sending or testing step, respectively, when the times in two successively generated tolling records differ by more than a predetermined time span.

19. The method of claim 17, further comprising:
   proceeding from the generating step to the sending or testing step, respectively, when the time in a most recently generated tolling record differs from the time in a tolling record of a preceding sending or testing step by more than a predetermined time span.

20. The method of claim 16, further comprising:
proceeding from the generating step to the sending or testing step, respectively, when the location in a most recently generated tolling record differs from the location in a tolling record of a preceding sending or testing step by more than a predetermined distance.

21. The method of claim 16, wherein, when a confidence level of the optical character recognition reading of the license plate number is below a given threshold, the respective picture or tolling record is deleted.

22. The method of claim 16, wherein two or more tolling records are merged into a merged tolling record when their locations match a predetermined geographical sequence.

23. The method of claim 22, wherein said merged tolling record(s) is/are used instead of said tolling record(s).

24. The method of claim 16, in which each tolling record includes a time when its picture was taken by the camera, wherein two or more tolling records are merged into a merged tolling record when their times fall within a predetermined time span.

25. The method of claim 24, wherein said merged tolling record(s) is/are used instead of said tolling record(s).

26. The method of claim 16, wherein the database comprises first parts kept at the camera(s) and a second part kept at the server and wherein the picture(s) is/are stored in the first parts, and wherein a picture is transferred from the first parts to the second part when the response does not confirm or the testing does not match, respectively.

27. The method of claim 16, wherein an electronic signature is received with the response or registration request, respectively, and is stored with a tolling record the picture of which is deleted.

28. The method of claim 16, wherein the user terminal is a mobile device and the network includes a mobile network serving the mobile device.

29. The method of claim 28, wherein the confirmation request or registration request respectively, is sent by a short message, an email, a webpage, or a data connection to an application on the mobile device.

30. The method of claim 16, wherein the location is a parking lot and the camera is directed towards an entrance, a parking space or an exit of the parking lot; or the location is a segment of a road and the camera is directed towards this road segment.

* * * * *